May 18, 1965  K. LEUTWYLER  3,184,247
SEAL RING EXTRUSION PREVENTING DEVICE
Filed Feb. 27, 1962  2 Sheets-Sheet 1

INVENTOR.
KURT LEUTWYLER
BY
Mellin and Hanscom
ATTORNEYS.

INVENTOR.
KURT LEUTWYLER
BY
Mellin and Hanscom
ATTORNEYS.

United States Patent Office 3,184,247
Patented May 18, 1965

3,184,247
SEAL RING EXTRUSION PREVENTING DEVICE
Kurt Leutwyler, Buena Park, Calif., assignor to Baker Oil Tools, Inc., Los Angeles, Calif., a corporation of California
Filed Feb. 27, 1962, Ser. No. 175,932
10 Claims. (Cl. 277—170)

The present invention relates to sealing devices, and more particularly to devices for preventing extrusion of seal rings, and the like, through adjacent clearance spaces.

Pliant, elastic seal rings, such as rubber or rubber-like O rings, have been used for preventing fluid leakage between adjacent parts, as, for example, between relatively movable valve parts, between a piston and cylinder, or between a piston rod and cylinder head. When subjected to high pressure differentials, the seal rings have been squeezed or extruded into or through clearance spaces between the adjacent parts. Such extrusion or loss of seal ring material has been more pronounced when the pliant, elastic seal rings are also subjected to high temperatures.

Devices have been proposed for preventing extrusions of the seal rings into the clearance spaces, including separate backing rings that expand into engagement with the surfaces against which the seal rings seal to bridge the clearance spaces. Although effective in arresting extrusion under comparatively high pressures and high temperature operating conditions, such backing rings do not prevent seal ring extrusion under very high pressure conditions. Apparently, they do not make contact and seal against the opposed sealing surface around their entire 360 degrees circumference, a leakage path still being present into and through which the pliant, elastic seal ring can be squeezed or extruded. As an example, it is found that extrusion still occurs at pressures above 15,000 p.s.i. and temperatures above 400° F. Accordingly, failure of equipment occurs, as in connection with its use in very deep well bores, of the order of 20,000 feet and therebelow, where pressure differentials of 20,000 p.s.i. and temperatures of 450° F. are encountered, and even higher.

Accordingly, it is an object of the present invention to prevent extrusion of pliant seal rings, and the like, between adjacent parts, despite the subjecting of the seal rings to very high pressure differentials and high temperatures.

Another object of the invention is to provide a device for preventing fluid leakage between relatively movable parts having working clearance, despite subjecting the device and relatively working parts to very high fluid pressures and operating temperatures, the parts still being capable of relative movement.

A further object of the invention is to provide a device for preventing extrusion of seal rings through clearance spaces when subjected to very high fluid pressures and to comparatively high temperatures, the extrusion preventing device completely bridging the clearance space and contacting an opposed sealing surface over the entire 360 degrees of its periphery, leaving no gaps whatsoever through which the seal ring material can be extruded.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 4 is a longitudinal section, parts being shown in side elevation, of another embodiment of the invention, including a sealing device operating against a shiftable piston rod, or the like;

Figure 1:
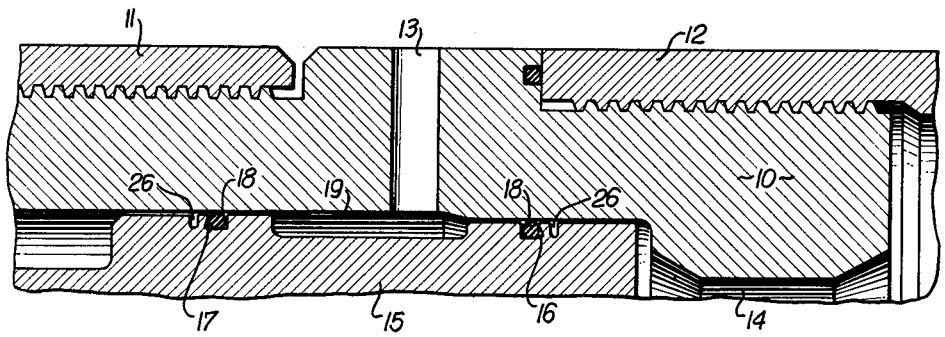
FIGURE 1 is a longitudinal section through a portion of a valve apparatus embodying the invention.
Figure 2:
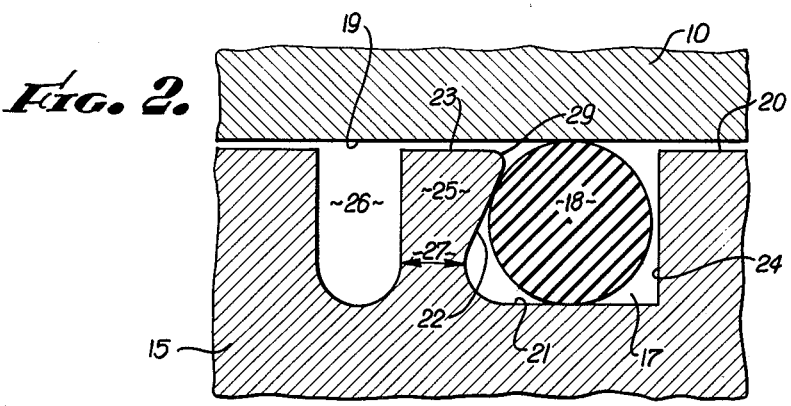
FIG. 2 is an enlarged section through a seal ring portion of the device shown in FIG. 1, with substantially no pressure being imposed upon the seal ring.
Figure 3:
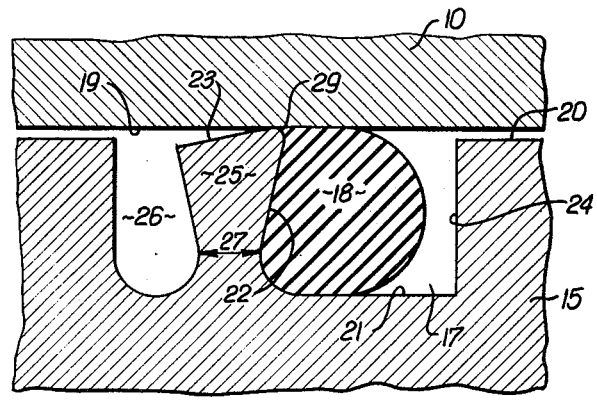
FIG. 3 is a view similar to FIG. 2 illustrating the general relationship of parts when subjected to comparatively high pressure differentials.

In the form of invention disclosed in FIGS. 1, 2 and 3, an external seal device is adapted to seal against an internal sealing surface. In the form of invention disclosed in FIGS. 4, 5 and 6, an internal seal device is adapted to seal against an external sealing surface.

In FIGS. 1, 2 and 3, a valve body 10 is suitably threaded to adjacent parts 11, 12, the valve body having one or a plurality of radial ports 13 establishing communication between its exterior and an inner or central passage 14. A piston valve member or head 15 is slidable in the valve body to open or close the ports 13. This piston has piston ring grooves 16, 17 adapted to be disposed in opposite sides of the port or ports 13, each of the ring grooves containing a pliant, elastic seal ring 18, such as a rubber or rubber-like O ring. The rings 18 are adapted to seal against the inner surface 19 of the valve body on opposite sides of its port or ports 13, and thereby prevent fluid from passing between the exterior of the valve body 10, through the ports 13, and past the piston 15 to the central passage 14 in the valve body. When the piston valve 15 is shifted, as to the left as shown in FIG. 1, so as to move its right-hand seal ring 18 and groove 16 to the left of the ports 13, the valve is open, and fluid communication established between the exterior of the valve body and its central passage 14.

Because of the need for shifting the piston valve member 15 within the valve body 10, for the purpose of opening or closing the ports 13, the periphery 20 of the valve member 15 has a diameter which is slightly less than the internal diameter of the inner cylindrical surface 19 against which a pliant, elastic seal ring 18 will seal, the seal ring extending from the base 21 of the seal ring groove to the surface 19. Desirably, the outside diameter of the piston 15 should be equal to the inside diameter of the valve body wall or surface 19, but as a practical matter, the outside diameter of the piston is several thousands of an inch less than the inside diameter of the opposed sealing surface. As shown in FIG. 1, the piston 15 at the left of the port 13 has a greater diameter than the piston portion to the right of the port. These diameters could be the same, as well as the coengaging sealing surfaces 19, or dissimilar, as desired. The fact of sameness or dissimilarity has no bearing on the present invention.

Assuming a very high pressure differential externally of the valve body 10, such as encountered in the event the valve body forms part of a subsurface well bore tool lowered to a depth of 20,000 feet or lower in a well bore, such fluid pressures will act on each seal ring 18 and force it against the downstream side 22 of its groove 16 or 17. The seal ring may also be forced into the clearance space 23 between the periphery 20 of the piston valve member and the opposed internal sealing surface 19.

Wells 20,000 feet and deeper may have bottom hole temperatures of 450° F., and the subjecting of the seal rings to the high pressure differential, which may be due to the hydrostatic head of fluid in the well bore, and also to the high temperatures, makes the rubber or rubber-like material of which the seal ring 18 is made more fluent and more easily extrudable into the annular clearance space 23 between the periphery 20 of the piston valve 15 and the wall 19 of the valve body. Extrusion of the seal ring material through the clearance space will result in the absence of sufficient material for performing its sealing purpose and leakage between the parts, causing failure of the equipment.

In the device disclosed in the drawings, such extrusion of each seal ring 18 is prevented. As shown, the seal ring groove 16 has an upstream side 24, a base 21, and a downstream side 22, the downstream side being inclined at a substantial obtuse angle to the opposed sealing surface 19 and providing a face against which the seal ring 18 bears. This face forms a side of a backing flange portion 25 of the piston valve member, which may be formed by providing a circumferential relief groove 26 behind the flange, resulting in a certain thickness of the root 27 of the flange between the curved base portion 21 of the groove and the base portion 28 of the relief groove. The thickness of the root 27 of the flange is such as to permit the flange 25, which is integral with the remainder of the piston valve member 15, to pivot when high pressure differentials are imposed thereon through the pliant, elastic seal ring 18, the flange, in effect, functioning as an annular cantilever beam and swinging or pivoting about its root portion 27 in a downstream direction until the outer end 29 of its face 22 engages the opposed sealing surface 19 of the valve body 10 (FIG. 3).

The thickness at the root 27 of the flange 25 and its total circumferential area must be such as to allow the flange to pivot and swing its inclined portion 22 toward a position normal to the sealing surface 19, but such thickness in area should still be sufficient to prevent the ultimate strength of the material from being exceeded under the combined shear and bending stresses applied to the root 27 of the flange by the fluid pressure differential imposed thereon through the pliant, elastic seal ring 18. Preferably, the area at the root 27 of a flange is such as to permit the flange to pivot into contact with the opposed sealing surface 19 and make a full 360 degrees contact therewith, but it must still be such as to prevent the yield point of the material from being exceeded under the combined shear and bending stresses applied thereto. Accordingly, when the fluid pressure differential is substantially reduced or relieved, the flange 25 will pivot back to its initial condition and again have a proper working clearance with the opposed sealing surface 19.

As an example of an apparatus made in conformance with FIGS. 1, 2 and 3, the normal or initial external diameter of the flange 25 may be 1.243 inches; whereas, its diameter at its minimum thickness, which may be deemed to be the root 27 of the flange, is 1.061 inches. The base 21 of the groove 16 may have a diameter of 0.999 inch; whereas, the thickness of the flange at its root is 0.050 inch. The clearance 23 between the periphery 20 of the flange and the opopsed surface 19 may be deemed to be 0.003 inch, and the obtuse angle 22 between the downstream side 22 of the groove 16 and flange face to the opposed sealing surface 19 may be about 120 degrees. The cross-sectional diameter of the rubber or rubber-like O ring 18 would then be about one-eighth of an inch. The valve member 15, including its flange 25, may be made of a suitable steel, such as a heat treated chromium molybdenum alloy steel. The relief groove 26 may have the same depth as the seal ring groove 16, and may have any desired width. The relief groove is provided to permit deflection of the flange 25 in a downstream direction. In fact, the flanges 25 may constitute a terminal portion of the piston valve 15, if desired, in which event there would be no need for a relief groove.

The specific example of apparatus referred to above has been successfully tested and has safely withstood pressure differentials of 20,000 p.s.i. acting on the seal ring 18 and causing it to bear against the downstream side 22 of the ring groove, which is the inclined face of the flange 25, the flange pivoting about its root diameter portion 27 and swinging outwardly, so that its outer corner 29 engages the opposed sealing surface 19. Such pressures have been applied over extended periods and at temperatures 450° F., all without loss or extrusion of any seal ring material between the flange 25 and the opposed sealing surface 19. The flange made a full 360 degrees contact with the opposed sealing surface 19, there being an absence of even minute gaps or spaces through which such high pressures and temperatures would readily have produced squeezing or extruding of the pliant packing material. Upon relieving of the pressure, the flange 25 returned to substantially its initial condition, such as disclosed in FIG. 2.

With the flange 25 pivoted outwardly into full 360 degrees contact with the opposed surface, the piston valve member 15 is still movable along the surface 19, the flange 25 sliding therealong while maintaining full contact therewith, and precluding extrusion of the rubber sealing material from the desired location, such as illustrated in FIG. 3.

In order to minimize the tendency of the hydraulic forces acting on the flange to embed the outer corner 29 of the flange in the opposed sealing surface 19, such corner may be rounded, as disclosed, to distribute the contact force over a greater area. With such rounding, the flange 25 may be required to pivot about its root portion 27 to a somewhat greater extent, but not to a sufficient extent as to exceed the ultimate strength of the material. It is desirable not to exceed the yield point of the material at the root 27 of the flange during the pivoting action, so that the flange will return to its initial state when the pressure is relieved, but even if the yield point is exceeded to some extent, the flange 25 may still return or spring back partially toward its initial condition and provide working clearance with the opposed sealing surface 19, and allow a relatively free subsequent sliding of the valve member 15 within the valve body 10.

The flange 25 is preferably made integral with the remainder of the valve piston 15 and, such construction is preferred. However, the flange could be formed as a separate part and then suitably attached, as by screw threading it, onto the valve piston. So long as the root 27 of the flange 25 is anchored to the piston valve member 15, it can pivot toward the opposed sealing surface 19, much in the nature of a cantilever beam, the inclined face 22 of the flange tending to straighten up and thereby swinging out into full contact with the opposed sealing surface.

In the form of invention illustrated in FIG. 1, the seal devices 18 are provided on opposite sides of the ports 13 to close the same. In the above example, the pressure differential is externally of the valve body 10 and will pass through the port to the piston valve member 15 between the seal rings 18, 18 on opposite sides of the port. Accordingly, the fluid pressure differential is acting in opposite directions on the seal rings 18, 18. For that reason, the right-hand seal device has its backing flange 25 at the right of the seal ring 18, and the left-hand seal device has its backing flange 25 at the left side of the seal ring 18. In both cases, the inclined side 22 of the flange is downstream of the associated seal ring 18. In other words, the downstream sides 22, 22 of the two flanges 25, 25 incline in opposite directions, but both of them make obtuse angles with the companion sealing surface 19. Each relief groove 26, of course, is provided on the downstream side of its associated flange 25.

Figure 4:
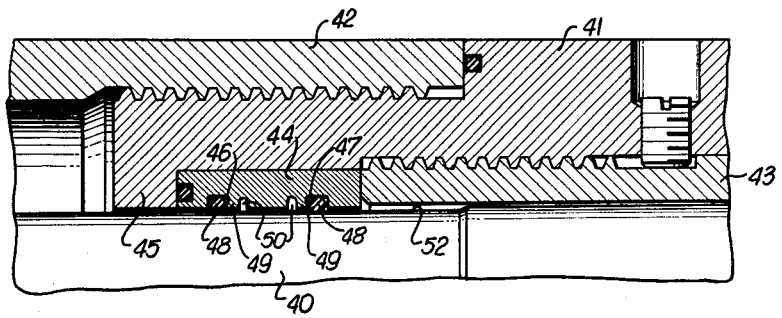
Figure 5:
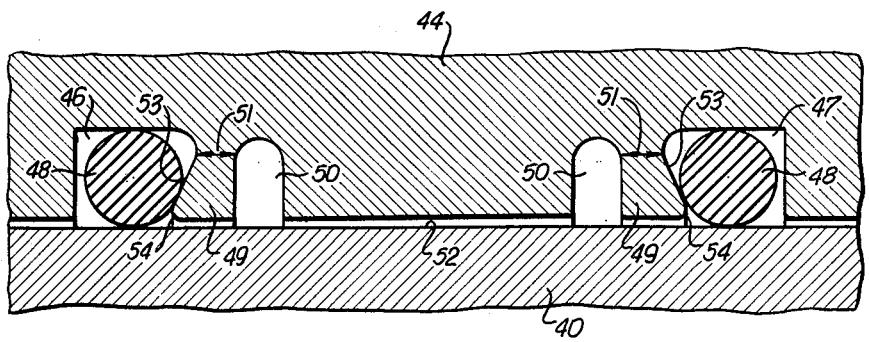
FIG. 5 is an enlarged section through the sealing portion of the apparatus shown in FIG. 4, with the parts subjected to substantially no fluid pressure differential.
Figure 6:
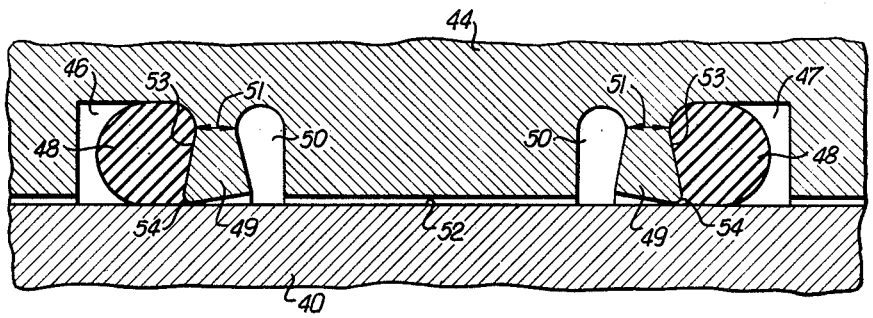
FIG. 6 is a view similar to FIG. 5 illustrating the relationship between the parts when subjected to a comparatively high pressure differential.

In the form of invention illustrated in FIGS. 4 to 6, it is desired to seal against a piston rod 40, or the like, by the use of internal seals. The piston rod is adapted to shift longitudinally within a companion cylinder head 41 that may be screw threaded, or otherwise suitably attached, to a cylinder sleeve 42, there being a sleeve extension 43 threaded into the head and bearing against a seal body member or sleeve 44, urging its opposite site end against a head flange 45. The body member 44 has longitudinally spaced inner grooves 46, 47 therein, each of which contains a pliant, elastic seal ring 48, such as a rubber or rubber-like O ring, engaging the periphery of the piston rod.

In the device shown in FIG. 4, fluid pressure differential will act on the right-hand seal ring 48 from the right thereof, and on the left-hand seal ring 48 from the left thereof. Accordingly, a backing flange 49 is provided adjacent to the right-hand ring 48 on the downstream or left side thereof and on the left-hand ring 48 on the downstream side thereof, which is the right side thereof. Both of these flanges are integral or otherwise secured to the body member 44, there being relief grooves 50 in the body member on the downstream sides to provide the appropriate flange thickness, particularly at each of the root portions 51. The flanges 49 make a desired working clearance with the companion external sealing surface, which is the periphery 52 of the piston rod, the working clearance being exaggerated in the drawings for purposes of clarity of illustration.

When not subjected to any pressure differentials, the seal rings 48 and associated flanges 49 occupy the positions illustrated in FIG. 5. Moreover, when subjected to sufficiently high pressures, the seal rings 48 are flattened or squeezed against the inclined downstream sides 53 of their backing flanges 49, pivoting such flanges about their root portions 51 and swinging their corners 54 outwardly into engagement with the periphery 52 of the piston rod. Again, such corners 54 are preferably rounded to minimize the tendency of their being embedded in the surface 52 of the piston rod. The flanges each contact the periphery of the piston rod over a full 360 degrees, there being no gaps, even minute ones, through which the rubber or rubber-like sealing material can be extruded under high pressure operating conditions, as, for example, of the order of 20,000 p.s.i., the packing material even being rendered more readily extrudable upon being subjected to high temperatures, which may be of the order of 450° F. Despite the fact that the seal ring 48 is forced against the periphery 52 of the piston rod and the corners or inner end portions 54 of the flanges also bear against the periphery of the piston rod 40, the latter can still be shifted longitudinally along the cylinder head 44, 41 and the flanges 49 and seal rings 48 in accomplishing its purpose in the well bore.

An actual device made in accordance with FIGS. 4 to 6 had the following dimensions, the body member 44 and its flanges 49 being made of a chrome molybdenum heat treated steel. The internal diameter of the flange 49 was initially 1.128 inches, its root diameter 51 (possessing the minimum width) being 1.311 inches. The base of the internal seal ring groove 46 had a diameter of 1.373 inches. The thickness of the flange 49 at its root 51 was 0.030 inch; whereas, each relief groove 50 had a depth that corresponded to the depth of the base of the seal ring groove. The inclined side 53 of each flange made an obtuse angle of about 125 degrees to the opposed sealing surface or periphery 52 of the piston rod. Such angle, however, can be varied substantially, depending on the initial working clearance between the inner cylindrical surface of the flange 49 and the adjacent periphery 52 of the piston rod 40.

The internal type of seal ring device shown in FIGS. 4 to 6, inclusive, will stand high pressure and temperature combinations very readily. When such pressure and temperature are relieved, the flanges 49 return substantially to their initial condition, the piston rod 40 being readily movable therealong.

I claim:

1. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a backing flange extending transversely of the axis of said second member and fixed thereto at the downstream side of said seal ring, the normal periphery of said backing flange having a close normal working clearance with the periphery of said sealing surface; said flange having a face inclined at an obtuse angle to said sealing surface and providing the downstream side of said groove, the side of said flange opposite said inclined face being free from support; said flange being made of such material and having a longitudinally extending root portion of such dimensions as to enable such flange to pivot about its root portion into contact with said sealing surface under the action of fluid pressure forcing said seal ring axially against said inclined face before said fluid pressure can force said seal ring into the working clearance space between said flange periphery and sealing surface.

2. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a backing flange extending transversely of the axis of said second member and fixed thereto at the downstream side of said seal ring, the normal periphery of said backing flange having a close normal working clearance with the periphery of said sealing surface; said flange having a face inclined at an obtuse angle to said sealing surface and providing the downstream side of said groove, the side of said flange opposite said inclined face being free from support; said flange having a longitudinally extending root portion of such dimensions as to enable such flange to pivot about its root portion into contact with said sealing surface under the action of fluid pressure forcing said seal ring axially against said inclined face before said fluid pressure can force said seal ring into the working clearance space between said flange periphery and sealing surface; said flange being made of such material and the dimensions of its root portion being such that the yield point of the material is not exceeded under the maximum combined shear and bending stresses imposed on said root portion by the fluid pressure.

3. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a backing flange extending transversely of the axis of said second member and integral therewith at the downstream side of said seal ring, said flange having normal working clearance with said sealing surface; said flange having a face inclined at an obtuse angle to said sealing curface and providing the downstream side of said groove, the side of said flange opposite said inclined face being free from support; said flange being made of such material and having a longitudinally extending root portion of such dimensions as to enable such flange to pivot about its root portion into contact with said sealing surface under the action of fluid pressure forcing said seal ring axially against said inclined face before said fluid pressure can force said seal ring into the working clearance space between said flange and sealing surface.

4. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a backing flange extending transversely of the axis of said second member and integral therewith at the downstream side of said seal ring, said flange having normal working clearance with said sealing surface; said flange having a face inclined at an obtuse angle to said sealing surface and providing the downstream side of said groove, the side of said flange opposite said inclined face being free from support; said flange having a longitudinally extending root portion of such dimensions as to enable such flange to pivot about its root portion into contact with said sealing surface under the action of fluid pressure forcing said seal ring axially against said inclined face before said fluid pressure can force said seal ring into the working clearance space between said flange and sealing surface; said flange being made of such material and the dimensions of its root portion being such that the yield point of the material is not exceeded under the maximum combined shear and bending stresses imposed on said root portion by the fluid pressure.

5. In a fluid pressure sealing structure: an outer member having an inner sealing surface extending longitudinally of its axis; an inner member within and surrounded by said outer member and having a peripheral ring groove therein confronting said surface, the sides of said groove extending transversely of the axis of said inner member; a pliant seal ring in said groove engaging said surface to prevent fluid leakage between said members; said inner member having a backing flange extending transversely of the axis of said inner member and fixed thereto at the downstream side of said seal ring, the normal periphery of said backing flange having a close normal working clearance with the periphery of said sealing surface; said flange having a face inclined at an obtuse angle to said inner sealing surface and providing the downstream side of said groove, the side of said flange opposite said inclined face being free from support; said flange being made of such material and having a longitudinally extending root portion of such dimensions as to enable said flange to pivot about its root portion and laterally outwardly into contact with said sealing surface under the action of fluid pressure forcing said seal ring axially against said inclined face before said fluid pressure can force said seal ring into the working clearance space between said flange periphery and sealing surface.

6. In a fluid pressure sealing structure: an outer member having an inner sealing surface extending longitudinally of its axis; an inner member within and surrounded by said outer member and having a peripheral ring groove therein confronting said surface, the sides of said groove extending transversely of the axis of said inner member; a pliant seal ring in said groove engaging said surface to prevent fluid leakage between said members; said inner member having a backing flange extending transversely of the axis of said inner member and fixed thereto at the downstream side of said seal ring, the normal periphery of said backing flange having a close normal working clearance with the periphery of said sealing surface; said flange having a face inclined at an obtuse angle to said inner sealing surface and providing the downstream side of said groove, the side of said flange opposite said inclined face being free from support; said flange having a longitudinally extending root portion of such dimensions as to enable said flange to pivot about its root portion and laterally outwardly into contact with said sealing surface under the action of fluid pressure forcing said seal ring axially against said inclined face before said fluid pressure can force said seal ring into the working clearance space between said flange periphery and sealing surface; said flange being made of such material and the dimensions of its root portion being such that the yield point of the material is not exceeded under the maximum combined shear and bending stresses imposed on said root portion by the fluid pressure.

7. In a fluid pressure sealing structure: an inner member having an external sealing surface extending longitudinally of its axis; an outer member surrounding said inner member and having an internal ring groove therein confronting said surface, the sides of said groove extending transversely of the axis of said outer member; a pliant seal ring in said groove engaging said surface to prevent fluid leakage between said members; said second member having a backing flange extending transversely of the axis of said outer member and fixed thereto at the downstream side of said seal ring, the normal periphery of said backing flange having a close normal working clearance with the periphery of said sealing surface; said flange having a face inclined at an obtuse angle to said outer sealing surface and providing the downstream side of said groove, the side of said flange opposite said inclined face being free from support; said flange being made of such material and having a longitudinally extending root portion of such dimensions as to enable said flange to pivot about its root portion laterally inwardly into contact with said external sealing surface under the action of fluid pressure forcing said seal ring axially against said inclined face before said fluid pressure can force said seal ring into the working clearance space between said flange periphery and sealing surface.

8. In a fluid pressure sealing structure: an inner member having an external sealing surface extending longitudinally of its axis; an outer member surrounding said inner member and having an internal ring groove therein confronting said surface, the sides of said groove extending transversely of the axis of said outer member; a pliant seal ring in said groove engaging said surface to prevent fluid leakage between said members; said second member having a backing flange extending transversely of the axis of said outer member and fixed thereto at the downstream side of said seal ring, the normal periphery of said backing flange having a close normal working clearance with the periphery of said sealing surface; said flange having a face inclined at an obtuse angle to said outer sealing surface and providing the downstream side of said groove, the side of said flange opposite said inclined face being free from support; said flange having a longitudinally extending root portion of such dimensions as to enable said flange to pivot about its root portion laterally inwardly into contact with said external sealing surface under the action of fluid pressure forcing said seal ring axially against said inclined face before said fluid pressure can force said seal ring into the working clearance space between said flange periphery and sealing surface; said flange being made of such material and the dimensions of its root portion being such that the yield point of the material is not exceeded under the maximum combined shear and bending stresses imposed on said root portion by the fluid pressure.

9. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a relief groove spaced axially from said ring groove to form a backing flange extending transversely of the axis of said second member and integral with said second member at the downstream side of said seal ring, the normal periphery of said backing flange having a close normal working clearance with the periphery of said sealing surface; said flange having a face inclined at an obtuse angle to said sealing surface and providing the downstream side of said groove; said flange being made of such material and having a longitudinally extending root portion of such dimensions as to enable said flange to pivot about its root portion into contact with said sealing surface under the action of fluid pressure forcing said seal ring axially against said inclined face before said fluid pressure can force said seal ring into the working clearance space between said flange periphery and sealing surface.

10. In a fluid pressure sealing structure: a first member having a sealing surface extending longitudinally of its axis; a second member having a ring groove therein confronting said surface, the sides of said groove extending transversely of the axis of said second member; one of said members surrounding said other member; a pliant seal ring in said groove engaging said surface to prevent fluid leakage between said members; said second member having a relief groove spaced axially from said ring groove to form a backing flange extending transversely of the axis of said second member and integral with said second member at the downstream side of said seal ring, the normal periphery of said backing flange having a close normal working clearance with the periphery of said sealing surface; said flange having a face inclined at an obtuse angle to said sealing surface and providing the downstream side of said groove; said flange having a longitudinally extending root portion of such dimensions as to enable said flange to pivot about its root portion into contact with said sealing surface under the action of fluid pressure forcing said seal ring axially against said inclined face before said fluid pressure can force said seal ring into the working clearance space between said flange periphery and sealing surface; said flange being made of such material and the thickness of its root portion being such that the yield point of the material is not exceeded under the maximum combined shear and bending stresses imposed on said root portion by the fluid pressure.

References Cited by the Examiner

UNITED STATES PATENTS

| | | | |
|---|---|---|---|
| 2,485,504 | 10/49 | Morgan | 277—237 XR |
| 2,772,900 | 12/56 | Campbell | 277—173 XR |
| 3,047,018 | 7/62 | Lucien. | |
| 3,047,266 | 7/62 | Ver Nooy. | |
| 3,088,442 | 5/63 | Self et al. | 277—173 XR |

FOREIGN PATENTS 506,965  11/54  Canada.

EDWARD V. BENHAM, *Primary Examiner.*

SAMUEL RITHBERG, *Examiner.*